US012775541B2

(12) United States Patent
Bagheri et al.

(10) Patent No.: US 12,775,541 B2
(45) Date of Patent: Oct. 27, 2026

(54) SYSTEMS, METHODS, AND MEDIA FOR FAULT LOCALIZATION IN DECLARATIVE SPECIFICATION LANGUAGES

(71) Applicant: NUTECH VENTURES, Lincoln, NE (US)

(72) Inventors: Hamid Bagheri, Lincoln, NE (US); Thanhvu Nguyen, Lincoln, NE (US); Guolong Zheng, Lincoln, NE (US)

(73) Assignee: NUTECH VENTURES, Lincoln, NE (US)

( * ) Notice: Subject to any disclaimer, the term of this patent is extended or adjusted under 35 U.S.C. 154(b) by 0 days.

(21) Appl. No.: 17/887,827

(22) Filed: Aug. 15, 2022

(65) Prior Publication Data

US 2023/0047860 A1 Feb. 16, 2023

Related U.S. Application Data

(60) Provisional application No. 63/233,181, filed on Aug. 13, 2021.

(51) Int. Cl.
*G06F 11/3604* (2025.01)

(52) U.S. Cl.
CPC ................................ *G06F 11/3608* (2013.01)

(58) Field of Classification Search
CPC .................................................. G06F 11/3608
See application file for complete search history.

(56) References Cited

U.S. PATENT DOCUMENTS 9,195,222 B2 11/2015 Kapinski et al.
2008/0250071 A1* 10/2008 Norring ................. G06Q 10/06
2008/0256404 A1* 10/2008 Funatsu ......... G01R 31/318342
714/724

(Continued)

FOREIGN PATENT DOCUMENTS

CN 110687433 A 11/2021

OTHER PUBLICATIONS

Manu Jose et al., "Cause clue clauses: error localization using maximum satisfiability" 2011 [retrieved on Dec. 14, 23], ACM SIGPLAN Notices, vol. 46, Issue 6, pp. 437-446, downloaded from <url>:https://dl.acm.org. (Year: 2011).*

(Continued)

*Primary Examiner* — S. Sough
*Assistant Examiner* — Stephen D Berman
(74) *Attorney, Agent, or Firm* — QUARLES & BRADY LLP

(57) ABSTRACT

In accordance with some embodiments, systems, methods, and media for fault localization in declarative specification languages are provided. One such method includes: receiving a model in a declarative specification language; querying an automated analysis of the declarative specification language for a counterexample, in which the counterexample is an instance of the model that does not satisfy a property; using a partial max satisfiability solver to find an instance that satisfies the property; determining one or more differences in an expression from the model between the counterexample and the satisfying instance; analyzing the differences between the counterexample and the satisfying instance; determining a suspicion score for the expression in the model; and causing the suspicion score to be presented.

18 Claims, 12 Drawing Sheets

(56) References Cited

U.S. PATENT DOCUMENTS

| | | | | |
|---|---|---|---|---|
| 2009/0125766 | A1* | 5/2009 | Safarpour | G06F 30/3323 714/724 |
| 2010/0281306 | A1* | 11/2010 | Sinha | G06F 11/3608 714/E11.208 |
| 2012/0203535 | A1* | 8/2012 | Arbel | G06N 5/01 703/22 |
| 2019/0018753 | A1* | 1/2019 | Saha | G06F 11/3624 |
| 2019/0098037 | A1* | 3/2019 | Shenoy, Jr. | H04L 63/1441 |
| 2019/0201081 | A1* | 7/2019 | Shelton, IV | A61B 18/1445 |
| 2019/0227902 | A1* | 7/2019 | Cheng | G06F 11/3608 |
| 2019/0358817 | A1* | 11/2019 | Ghazaei Ardakani | B25J 9/1689 |
| 2020/0201741 | A1* | 6/2020 | Saha | G06F 8/30 |

OTHER PUBLICATIONS

Simon Brida et al., "Bounded Exhaustive Search of Alloy Specification Repairs," May 7, 2021 [retrieved on Dec. 12, 2023], IEEE/ACM 43rd International Conference on Software Engineering (ICSE), pp. 1135-1147, downloaded from <url>:https://ieeexplore.ieee.org. ( Year: 2021).*

Changjian Zhang et al., "AlloyMax: Bringing Maximum Satisfaction to Relational Specifications", Aug. 18, 2021 [retrieved Dec. 27, 2025], pp. 155-167, downloaded from <url>https://dl.acm.org/doi/abs/10.1145/3468264.3468587. (Year: 2021).*

Xujie Si et al., "Maximum Satisfiability in Software Analysis: Applications and Techniques, " Jul. 13, 2017 [Dec. 27, 2025], pp. 68-94, downloaded from <url>:https://link.springer.com/chapter/10.1007/978-3-319-63387-9_4. (Year: 2017).*

Yibin Chen et al., "Spatial and Temporal Design Debug using Partial MaxSAT", 2009 [retrieved May 27, 2026], pp. 345-350, downloaded from <url>:https://dl.acm.org/doi/abs/10.1145/1531542.1531621. (Year: 2009).*

Aman Duerja et al., "ALDB: Debugging Alloy Models of Behavioural Requirements", 2020 [retrieved May 27, 2026], pp. 21-30, downloaded from <url>:https://ieeexplore.ieee.org/abstract/document/9233018. (Year: 2020).*

Wang et al. "Fault Localization for Declarative Models in Alloy," in International Symposium on Software Reliability Engineering (ISSRE), 2020, pp. 391-402. 12 pages.

Zhang et al., "Debugging declarative models in Alloy." 2020 IEEE International Conference on Software Maintenance and Evolution (ICSME). IEEE, 2020. 5 pages.

Zheng et al., "FLACK: Counterexample-guided fault localization for alloy models." 2021 IEEE/ACM 43rd International Conference on Software Engineering (ICSE). IEEE, 2021.

Wang et al., "Arepair: a repair framework for alloy." 2019 IEEE/ACM 41st International Conference on Software Engineering: Companion Proceedings (ICSE-Companion). IEEE, 2019. 103-6.

Thompson et al., "Profl: a fault localization framework for prolog." Proceedings of the 29th ACM SIGSOFT International Symposium on Software Testing and Analysis. 2020. 561-4.

* cited by examiner

```
1  one sig FSM {
2    start: set State,
3    stop: set State
4  }
5  sig State { transition: set State }
6  fact OneStartAndStop {
7    // If a start state exists, there is only one of them
8    all start1, start2 : FSM.start | start1 = start2
9    // If a stop state exists, there is only one of them
10   all stop1, stop2 : FSM.stop | stop1 = stop2
11   some FSM.stop
12 }
13 fact ValidStartAndStop {
14   // start state is not a subset of stop state
15   FSM.start !in FSM.stop
16   // No transition ends at the start state.
17   all s : State | FSM.start !in s.transition
18   // Error: should be "<=>" instead of "=>".
19   all s: State | s.transition = none => s in FSM.stop
20 }
21 fact Reachability {
22   // All states are reachable from the start state.
23   State = FSM.start.*transition
24   // The stop state is reachable from any state.
25   all s: State | FSM.stop in s.*transition
26 }
27 assert NoStopTransition{
28   no FSM.stop.transition
29 }
30 check NoStopTransition for 5
```

FIG. 3

| Suspicious Expression | Score |
|---|---|
| s.transition = none => s in FSM.stop (=>) [19] | 1.58 |
| s.transition = none [19] | 1.25 |
| FSM.stop in s.*transtion [25] | 0.5 |
| s in FSM.stop [19] | 0.5 |

FIG. 4

| Relation | Tuples |
|---|---|
| FSM | FSM0 |
| start | FSM0->State0 |
| stop | FSM0->State3 |
| State | State0, State1, State2, State3 |
| transition | State0->State1, State0->State3, State1->State2, State2->State3, State3->State1 |

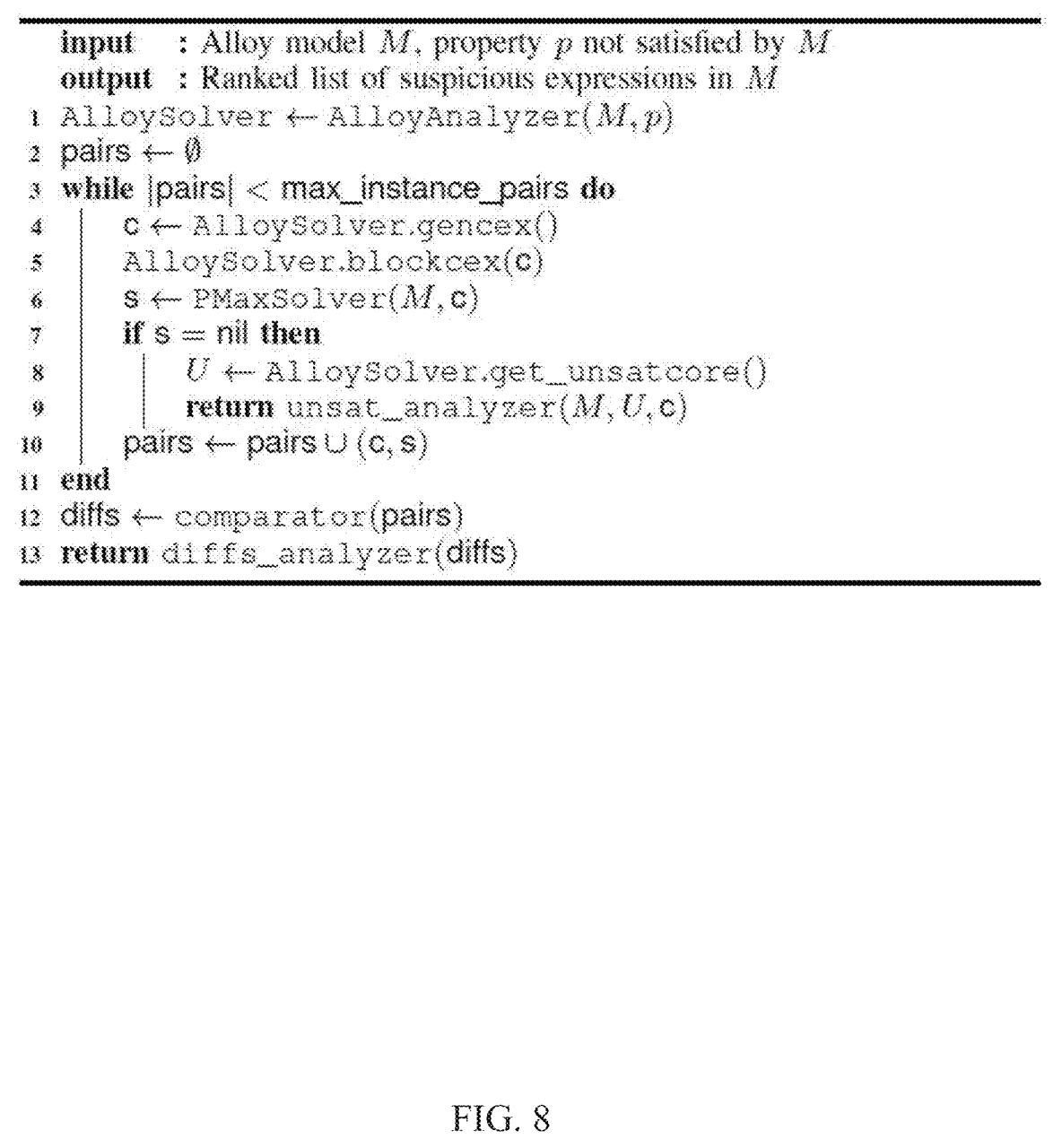

```
input  : Alloy model M, property p not satisfied by M
output : Ranked list of suspicious expressions in M
AlloySolver ← AlloyAnalyzer(M, p)
pairs ← ∅
while |pairs| < max_instance_pairs do
    c ← AlloySolver.gencex()
    AlloySolver.blockcex(c)
    s ← PMaxSolver(M, c)
    if s = nil then
        U ← AlloySolver.get_unsatcore()
        return unsat_analyzer(M, U, c)
    pairs ← pairs ∪ (c, s)
end
diffs ← comparator(pairs)
return diffs_analyzer(diffs)
```

FIG. 8

(a) Model Instance (b) Model Instance

```
input   : Alloy model M, differences diffs, pairs of cex's and sat
          instances pairs
output  : Ranked list of suspicious expressions in M
exprs ← get_susp_exprs(M, diffs)
results ← {}
foreach expr ∈ exprs do
    computescore (expr, results)
end
return sort (results)

Function computescore (expr, results):
    score = 0
    if isleaf (expr) then
        isexpr ← instantiate(expr, diff)
        foreach (c, s) ∈ pairs do
            cvals ← eval(c, isexpr)
            svals ← eval(s, isexpr)
            instscore ← 0
            if diff ⊂ cvals then
                instscore ← instscore + |diff| / |cvals|
            if diff ⊂ svals then
                instscore ← instscore + |diff| / |svals|
            score ← score + instscore / 2 )
        end
        score ← score / |pairs|
    else
        if isbool(expr) then
            isexpr ← instantiate(expr, diff)
            foreach (c, s) ∈ pairs do
                if eval(c, isexpr) ≠ eval(s, isexpr) then
                    score ← score + 1
            end
        foreach child ∈ getchildren(expr) do
            score ← score + computescore(child, results)
        end
    end
    results ← results ∪ (expr, score)
    return score
```

FIG. 10

```
input  : Alloy model M, unsat core U, counterexample c
output : a set of expressions in M
M' ← slice(M, U)
s ← PMaxSolver(M', c)
diffs ← comparator({(c, s)})
exprs ← collect_exprs(U)
conflicts ← ∅
foreach expr ∈ exprs do
    foreach diff ∈ diffs do
        if eval(expr, diff, M') = false then
            conflicts ← conflicts ∪ expr
    end
end
return conflicts
```

FIG. 11

TABLE III: Results of FLACK on 152 Alloy models. Results are sorted based on ranking accuracy. Times are in seconds.

| model | loc | total | sliced | rank | time |
|---|---|---|---|---|---|
| **top 1 (91)** | **41** | **139** | **95** | **1** | **0.2** |
| addr | 21 | 74 | 30 | 1 | 0.6 |
| arr3 | 24 | 48 | 9 | 1 | 0.1 |
| arr4 | 24 | 64 | 61 | 1 | 0.2 |
| arr5 | 24 | 62 | 59 | 1 | 0.2 |
| arr6 | 25 | 56 | 38 | 1 | 0.3 |
| arr7 | 25 | 63 | 58 | 1 | 0.1 |
| bst2 | 56 | 134 | 58 | 1 | 0.4 |
| bst2_1 | 56 | 134 | 95 | 1 | 0.3 |
| bst3_2 | 55 | 143 | 68 | 1 | 0.2 |
| cd1 | 27 | 44 | 33 | 1 | 0.0 |
| cd1_1 | 27 | 44 | 31 | 1 | 0.0 |
| cd2 | 27 | 35 | 25 | 1 | 0.0 |
| cd3 | 26 | 43 | 32 | 1 | 0.0 |
| cd3_1 | 26 | 46 | 31 | 1 | 0.0 |
| dll1 | 37 | 77 | 63 | 1 | 0.1 |
| dll2 | 42 | 77 | 63 | 1 | 0.1 |
| dll3 | 37 | 80 | 59 | 1 | 0.0 |
| dll3_1 | 37 | 75 | 49 | 1 | 0.1 |
| dll4 | 37 | 81 | 67 | 1 | 0.1 |
| dll5_1 | 39 | 102 | 80 | 1 | 0.1 |
| dll6 | 36 | 113 | 94 | 1 | 0.1 |
| dll7_1 | 36 | 73 | 59 | 1 | 0.1 |
| dll8 | 36 | 96 | 76 | 1 | 0.1 |
| dll9 | 38 | 100 | 91 | 1 | 0.1 |
| dll11 | 36 | 87 | 68 | 1 | 0.1 |
| dll12 | 36 | 77 | 63 | 1 | 0.1 |
| dll13 | 36 | 60 | 51 | 1 | 0.0 |
| dll14_1 | 37 | 85 | 73 | 1 | 0.1 |
| dll15 | 40 | 126 | 107 | 1 | 0.1 |
| dll16 | 36 | 82 | 68 | 1 | 0.1 |
| dll17_1 | 36 | 77 | 63 | 1 | 0.1 |
| dll18 | 36 | 102 | 84 | 1 | 0.0 |
| dll18_1 | 36 | 101 | 87 | 1 | 0.1 |
| dll20 | 36 | 90 | 64 | 1 | 0.0 |
| farmer | 99 | 124 | 30 | 1 | 1.6 |
| fsm1_1 | 30 | 90 | 19 | 1 | 0.0 |
| fsm7_1 | 29 | 59 | 14 | 1 | 0.0 |
| fsm9_4 | 30 | 91 | 78 | 1 | 0.1 |
| grade | 33 | 32 | 7 | 1 | 0.0 |
| ssl1 | 40 | 168 | 126 | 1 | 0.1 |
| ssl2 | 40 | 150 | 122 | 1 | 0.1 |
| ssl3 | 45 | 188 | 135 | 1 | 0.0 |
| ssl3_1 | 44 | 184 | 121 | 1 | 0.2 |
| ssl4 | 40 | 146 | 118 | 1 | 0.1 |
| ssl5 | 42 | 188 | 160 | 1 | 0.6 |
| ssl6 | 42 | 157 | 148 | 1 | 0.7 |
| ssl6_1 | 42 | 157 | 148 | 1 | 0.5 |
| ssl6_2 | 41 | 132 | 119 | 1 | 0.1 |
| ssl6_3 | 42 | 132 | 107 | 1 | 0.1 |
| ssl7 | 41 | 136 | 95 | 1 | 0.1 |
| ssl7_1 | 40 | 135 | 110 | 1 | 0.1 |
| ssl8 | 43 | 166 | 119 | 1 | 0.1 |
| ssl10 | 43 | 155 | 130 | 1 | 0.1 |
| ssl12 | 40 | 157 | 134 | 1 | 0.1 |
| ssl14 | 44 | 158 | 149 | 1 | 0.5 |
| ssl14_1 | 44 | 158 | 149 | 1 | 0.5 |
| ssl14_2 | 43 | 153 | 120 | 1 | 0.0 |
| ssl14_3 | 44 | 153 | 108 | 1 | 0.1 |
| ssl17 | 41 | 152 | 119 | 1 | 0.0 |
| ssl17_1 | 42 | 152 | 106 | 1 | 0.1 |
| ssl18_1 | 40 | 160 | 118 | 1 | 0.1 |
| ssl18_2 | 49 | 161 | 85 | 1 | 0.3 |
| ssl19 | 40 | 169 | 141 | 1 | 0.1 |
| *arr1* | 24 | 45 | 31 | 1 | 0.1 |
| *arr2* | 25 | 60 | 47 | 1 | 0.2 |
| *arr10* | 24 | 59 | 45 | 1 | 0.0 |
| *bst1* | 51 | 171 | 155 | 1 | 0.2 |
| *bst4_1* | 52 | 163 | 147 | 1 | 0.1 |
| *bst5* | 52 | 184 | 168 | 1 | 0.1 |
| *bst7* | 52 | 159 | 143 | 1 | 0.1 |
| *bst8_2* | 58 | 156 | 140 | 1 | 0.1 |
| *bst9* | 55 | 185 | 169 | 1 | 0.1 |
| *bst10* | 47 | 157 | 140 | 1 | 0.6 |
| *bst10_2* | 52 | 172 | 156 | 1 | 0.1 |
| *bst11_1* | 60 | 214 | 198 | 1 | 0.1 |
| *bst13* | 53 | 200 | 184 | 1 | 0.1 |
| *bst14* | 50 | 202 | 186 | 1 | 0.1 |
| *bst15* | 53 | 197 | 181 | 1 | 0.1 |
| *bst17_1* | 52 | 201 | 185 | 1 | 0.1 |
| *bst18_1* | 56 | 204 | 188 | 1 | 0.1 |
| *bst20* | 52 | 169 | 153 | 1 | 0.1 |
| *bst21* | 52 | 182 | 166 | 1 | 0.2 |
| *bst22* | 50 | 233 | 158 | 1 | 0.6 |
| *dll7* | 38 | 90 | 79 | 1 | 0.1 |
| *dll10* | 40 | 91 | 85 | 1 | 0.2 |
| *dll14* | 39 | 102 | 91 | 1 | 0.1 |
| *dll17* | 37 | 89 | 83 | 1 | 0.1 |
| *fsm1* | 31 | 90 | 71 | 1 | 0.0 |
| *fsm3* | 60 | 67 | 56 | 1 | 0.7 |
| *fsm9* | 30 | 91 | 79 | 1 | 0.5 |
| *fsm9_3* | 32 | 91 | 78 | 1 | 0.1 |
| **top 2-5 (35)** | **40** | **128** | **66** | **2.9** | **0.2** |
| arr7_1 | 24 | 46 | 9 | 2 | 0.9 |
| arr9 | 27 | 83 | 43 | 2 | 0.2 |
| bst2_3 | 52 | 133 | 68 | 2 | 0.1 |
| bst12 | 47 | 146 | 94 | 2 | 0.2 |
| bst18 | 53 | 187 | 115 | 2 | 1.4 |
| bst19 | 47 | 158 | 112 | 2 | 0.1 |
| bst19_1 | 52 | 175 | 112 | 2 | 0.1 |
| dll2_1 | 43 | 82 | 57 | 2 | 0.0 |
| dll17_2 | 36 | 82 | 57 | 2 | 0.0 |
| dll18_3 | 36 | 103 | 78 | 2 | 0.0 |
| dll19 | 36 | 83 | 63 | 2 | 0.1 |
| dll20_1 | 36 | 88 | 88 | 2 | 0.1 |
| dll20_2 | 36 | 88 | 47 | 2 | 0.0 |
| fsm6 | 29 | 98 | 17 | 2 | 0.0 |
| fsm9_2 | 29 | 90 | 18 | 2 | 0.1 |
| ssl11 | 42 | 177 | 127 | 2 | 0.1 |
| bst8 | 59 | 134 | 57 | 3 | 0.3 |
| bst8_1 | 59 | 134 | 57 | 3 | 0.2 |
| bst22_1 | 49 | 199 | 124 | 3 | 0.1 |
| dll1_1 | 38 | 86 | 57 | 3 | 0.1 |
| dll18_2 | 36 | 107 | 71 | 3 | 0.6 |
| fsm4 | 31 | 141 | 39 | 3 | 0.0 |
| fsm5_2 | 29 | 69 | 17 | 3 | 0.0 |
| ssl2_1 | 44 | 156 | 72 | 3 | 0.1 |
| ssl13 | 48 | 174 | 123 | 3 | 0.1 |
| ssl18 | 40 | 162 | 131 | 3 | 0.0 |
| arr8 | 25 | 80 | 15 | 4 | 0.5 |
| bst2_3 | 47 | 147 | 92 | 4 | 0.1 |
| bst3 | 57 | 137 | 97 | 4 | 0.1 |
| fsm2 | 29 | 70 | 14 | 4 | 0.0 |
| fsm8 | 29 | 71 | 14 | 4 | 0.1 |
| arr11 | 24 | 83 | 41 | 5 | 0.1 |
| bst10_3 | 55 | 162 | 75 | 5 | 0.3 |
| fsm9_1 | 29 | 91 | 18 | 5 | 0.1 |
| ssl15 | 41 | 181 | 106 | 5 | 0.1 |
| **top 6-10 (10)** | **51** | **155** | **73** | **7.6** | **0.2** |
| bst3_1 | 57 | 137 | 58 | 6 | 0.2 |
| bst20_1 | 55 | 152 | 61 | 6 | 0.2 |
| fsm7 | 29 | 64 | 14 | 6 | 0.1 |
| ssl19_1 | 50 | 175 | 106 | 7 | 0.6 |
| bst6 | 51 | 140 | 61 | 8 | 0.2 |
| bst12_1 | 58 | 164 | 68 | 8 | 0.2 |
| bst19_2 | 55 | 154 | 86 | 8 | 0.2 |
| ssl19_2 | 44 | 174 | 81 | 8 | 0.3 |
| bst17_2 | 55 | 177 | 79 | 9 | 0.2 |
| bst22_2 | 54 | 209 | 118 | 10 | 0.1 |
| **> 10 (6)** | **51** | **172** | **80** | **12.7** | **0.3** |
| bst4_2 | 51 | 154 | 83 | 11 | 0.3 |
| bst16 | 64 | 181 | 79 | 12 | 0.3 |
| bst17 | 48 | 186 | 113 | 12 | 0.2 |
| ssl12_1 | 44 | 161 | 78 | 12 | 0.4 |
| ssl9 | 44 | 153 | 72 | 13 | 0.1 |
| bst22_3 | 57 | 199 | 74 | 16 | 0.5 |
| **fail (10)** | **42** | **104** | **71** | **-** | **0.1** |
| bst4 | 46 | 145 | 95 | - | 0.1 |
| bst11 | 54 | 196 | 135 | - | 0.2 |
| bempl | 51 | 34 | 7 | - | 0.0 |
| cross | 30 | 49 | 5 | - | 0.0 |
| dll3_2 | 36 | 75 | 67 | - | 0.0 |
| other | 34 | 36 | 19 | - | 0.0 |
| ssl16 | 39 | 137 | 119 | - | 0.0 |
| ssl16_1 | 39 | 133 | 115 | - | 0.0 |
| ssl16_2 | 47 | 136 | 74 | - | 0.3 |
| ssl16_3 | 43 | 133 | 73 | - | 0.2 |

FIG. 12

| model | loc | total | sliced | rank | time(s) |
|---|---|---|---|---|---|
| surgical robots | 200 | 293 | 278 | 2 | 2.3 |
| android permissions | 297 | 1138 | 673 | 2 | 5.2 |
| sll-contains | 5250 | 5562 | 5510 | 3 | 3.0 |
| count-nodes | 3791 | 5064 | 2861 | 18 | 188.7 |
| remove-nth | 5063 | 6336 | 3306 | 12 | 1265.0 |

FIG. 13

| tool | top | | | | | avg | |
|---|---|---|---|---|---|---|---|
| | 1 | 5 | 10 | > 10 | failed | rank | time(s) |
| 1 | 91 | 126 | 136 | 6 | 10 | 2.4 | 0.2 |
| 2 | 76 | 128 | 137 | 8 | 7 | 3.1 | 32.4 |

FIG. 14

SYSTEMS, METHODS, AND MEDIA FOR FAULT LOCALIZATION IN DECLARATIVE SPECIFICATION LANGUAGES

CROSS-REFERENCE TO RELATED APPLICATIONS

This application is based on, claims the benefit of, and claims priority to U.S. Provisional Application No. 63/233,181, filed Aug. 13, 2021, which is hereby incorporated herein by reference in its entirety for all purposes.

STATEMENT REGARDING FEDERALLY SPONSORED RESEARCH

N/A

BACKGROUND

Fault localization techniques help developers to identify code locations that might cause bugs in a program. Most existing fault localization techniques are designed for imperative programs (e.g. C and Java) and rely on analyzing correct and incorrect executions of the program to identify suspicious statements.

Existing fault localization techniques designed for declarative specification languages rely on unit tests, mutation testing, and statistical debugging techniques. However, such techniques are slow and inaccurate. Therefore, existing fault localization techniques for declarative specification languages limit confidence in the modeled results, as well as feasibility for analyzing large complex models.

Accordingly, new systems, methods, and media for fault localization in declarative specification languages are desirable.

SUMMARY

In accordance with some embodiments of the present disclosure, systems, methods, and media for fault localization in declarative specification languages are provided.

In accordance with some embodiments of the present disclosure, a method for fault localization is provided, the method comprising: receiving a model in a declarative specification language; querying an automated analysis of the declarative specification language for a counterexample, wherein the counterexample is an instance of the model that does not satisfy a property; using a partial max satisfiability solver to find an instance that satisfies the property; determining one or more differences in an expression from the model between the counterexample and the satisfying instance; analyzing the one or more differences between the counterexample and the satisfying instance to compute a suspicion score for the expression in the model; and causing the suspicion score to be presented.

In some embodiments, the declarative specification language is Alloy.

In some embodiments, the expression comprises one or more relations and one or more atoms.

In some embodiments, the method further comprises: determining, for each of a plurality of expressions in the model, a suspicion score of a respective plurality of suspicion scores; and causing the plurality of suspicion scores to be presented.

In some embodiments, the model models a positioning of one or more surgical robots.

In some embodiments, the model models permissions on one or more electronic devices.

In accordance with some embodiments of the present disclosure, a system for fault localization is provided, the system comprising: at least one processor that is programmed to: receive a model in a declarative specification language; query an automated analysis of the declarative specification language for a counterexample, wherein the counterexample is an instance of the model that does not satisfy a property; use a partial max satisfiability solver to find an instance that satisfies the property; determine one or more differences in an expression from the model between the counterexample and the satisfying instance; analyze the one or more differences between the counterexample and the satisfying instance; determine a suspicion score for the expression in the model; and cause the suspicion score to be presented.

In accordance with some embodiments of the present disclosure, a non-transitory computer readable medium containing computer executable instructions that, when executed by a processor, cause the processor to perform a method for fault localization is provided, the method comprising: receiving a model in a declarative specification language; querying an automated analysis of the declarative specification language for a counterexample, wherein the counterexample is an instance of the model that does not satisfy a property; using a partial max satisfiability solver to find an instance that satisfies the property; determining one or more differences in an expression from the model between the counterexample and the satisfying instance; analyzing the one or more differences between the counterexample and the satisfying instance; determining a suspicion score for the expression in the model; and causing the suspicion score to be presented.

BRIEF DESCRIPTION OF THE DRAWINGS

Various objects, features, and advantages of the present disclosure can be more fully appreciated with reference to the following detailed description of the present disclosure when considered in connection with the following drawings, in which like reference numerals identify like elements.

FIG. 3 shows an example Alloy specification of a buggy finite state machine (FSM) model.

FIG. 4 shows results obtained from the example model in FIG. 3 using mechanisms described herein.

FIG. 8 shows an example algorithm that can be used in a fault localization process in accordance with some embodiments of the of the present disclosure.

FIG. 10 shows an example algorithm that can be used to analyze differences between pairs of instances in accordance with some embodiments of the present disclosure.

FIG. 11 shows an example algorithm that can be used to analyze a set of unsatisfying formulas in accordance with some embodiments of the present disclosure.

FIG. 12 shows example results generated using mechanisms described herein to locate faults in 152 buggy models.

FIG. 13 shows example results generated using mechanisms described herein to analyze large complex models.

FIG. 14 shows an example comparing performance of mechanisms described herein and another technique locating faults in various models.

DETAILED DESCRIPTION

In accordance with various embodiments, mechanisms (which can, for example, include systems, methods, and media) for fault localization in declarative specification languages are provided.

Declarative specification languages and the corresponding formally precise analysis engines have long been utilized to solve various software engineering problems. The Alloy specification language relies on first-order relational logic, and has been used in a wide range of applications, such as program verification, test case generation, software design, network security, security analysis of emerging platforms (e.g., such as IoT and Android), and design tradeoff analysis.

Similar to developing programs in an imperative language, such as C or Java, developers can make subtle mistakes when using a declarative specification language, such as Alloy, in modeling system specifications. Avoiding such mistakes can be especially difficult when developing programs that capture complex systems with non-trivial behaviors, rendering debugging thereof even more arduous. These challenges call for debugging assistant mechanisms, such as fault localization techniques, that support declarative specification languages.

Conventional fault localization techniques for declarative specification languages rely on unit testing to locate suspicious expressions. For such techniques, it is unclear how many test cases are needed for the unit tests, and further how detailed the tests must be. Therefore, existing fault localization techniques are relatively slow and inaccurate.

In some embodiments, mechanisms described herein can be used to localize faults more quickly and/or more accurately than conventional techniques. For example, in some embodiments, mechanisms described herein can query an underlying automated analysis of a declarative specification language for a counterexample that does not satisfy a property of a model written in a declarative specification language. As another example, mechanisms described herein can use a partial max satisfiability solver to find an instance that satisfies the property and is relatively close (e.g., as close as possible) to the counterexample. In such examples, mechanisms described herein can then compare differences in expressions from the model between the counterexample and the satisfying instance to compute suspicion scores for the expressions in the model. As disclosed further herein, mechanisms (which can, for example, include systems, methods, and media) for fault localization in declarative specification languages according to the embodiments of the present disclosure are faster and more accurate than conventional techniques, which is of particular importance as models in declarative specification languages continue to grow larger and increasingly complex for a variety of applications.

Figure 1:
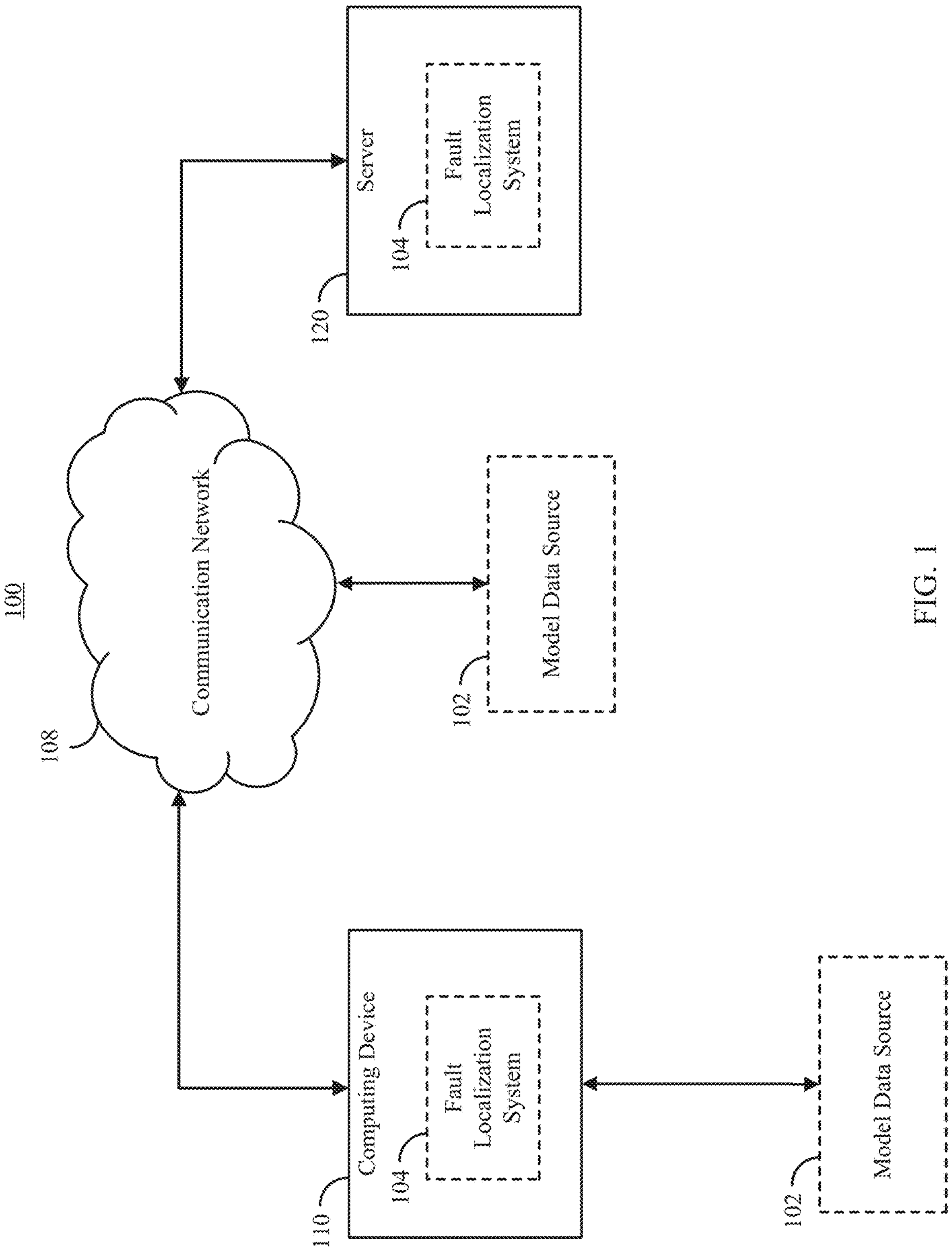
FIG. 1 shows an example of a system for fault localization in declarative specification languages in accordance with some embodiments of the present disclosure.

FIG. 1 shows an example 100 of a system for fault localization in declarative specification languages in accordance with some embodiments of the present disclosure. As shown in FIG. 1, a computing device 110 can receive model data from a model data source 102. In some embodiments, computing device 110 can execute at least a portion of a fault localization system 104 to locate buggy expressions.

In some embodiments, computing device 110 can execute at least a portion of fault localization system 104 to compare satisfying and unsatisfying instances of a model to compute suspicion scores for expressions in the model with relatively high accuracy using mechanisms described herein (e.g., compared to time consuming or unreliable conventional techniques that rely on unit testing, mutation testing, or static analysis for effects of testing).

Additionally or alternatively, in some embodiments, computing device 110 can communicate data received from model data source 102 to a server 120 over a communication network 108, which can execute at least a portion of fault localization system 104. In such embodiments, server 120 can return information to computing device 110 (and/or any other suitable computing device) indicative of an output of a fault localization process. In some embodiments, fault localization system 104 can execute one or more portions of process 1000 described below in connection with FIG. 15.

In some embodiments, computing device 110 and/or server 120 can be any suitable computing device or combination of devices, such as a desktop computer, a laptop computer, a smartphone, a tablet computer, a wearable computer, a server computer, a virtual machine being executed by a physical computing device, etc.

In some embodiments, model data source 102 can be any suitable source of model data (e.g., data modeled using a declarative specification language, or data modeled using a first-order logic tool that relies on sets of atoms and relations for expressions) and/or other data that can be used to locate buggy expressions in models. In a more particular example, model data source 102 can include memory storing modeling data (e.g., local memory of computing device 110, local memory of server 120, cloud storage, portable memory connected to computing device 110, portable memory connected to server 120, etc.). In another more particular example, model data source 102 can include an application configured to generate model data (e.g., a fault localization application being executed by computing device 110, server 120, and/or any other suitable computing device).

In some embodiments, model data source 102 can be local to computing device 110. For example, model data source 102 can be incorporated with computing device 110 (e.g., computing device 110 can include memory that stores model data, and/or can execute a program that generates model data). As another example, model data source 102 can be connected to computing device 110 by a cable, a direct wireless link, etc. Additionally or alternatively, in some embodiments, model data source 102 can be located locally and/or remotely from computing device 110, and can communicate model data to computing device 110 (and/or server 120) via a communication network (e.g., communication network 108).

In some embodiments, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 108 can be a local area network (LAN), a wide area network (WAN), a public network (e.g., the Internet), a private or semi-private network (e.g., a corporate or university intranet), any other suitable type of network, or any suitable combination of networks. Communications links shown in FIG. 1 can each be any suitable communications link or combination of communications links, such as wired links, fiber optic links, Wi-Fi links, Bluetooth links, cellular links, etc.

Figure 2:
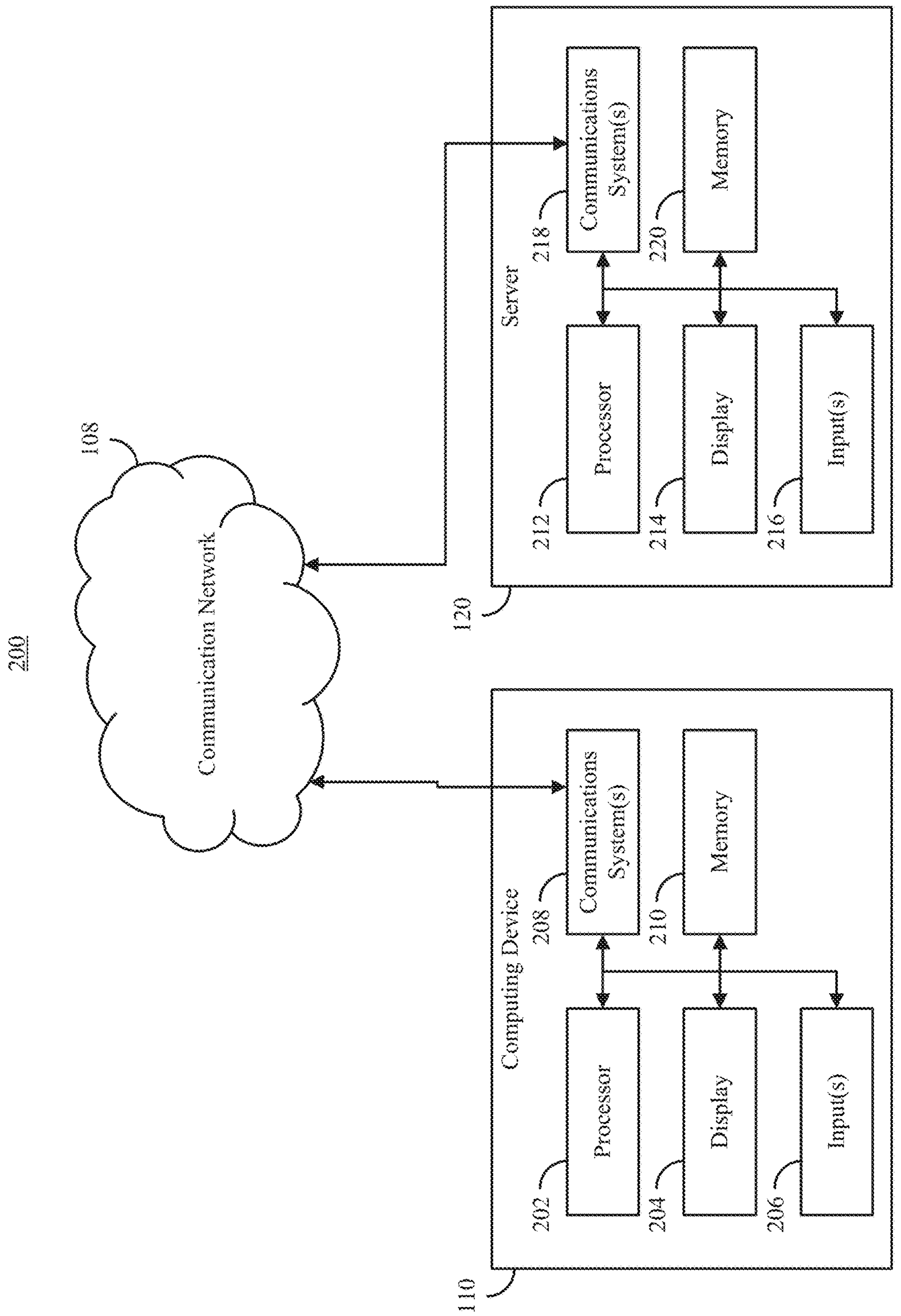
FIG. 2 shows an example of hardware that can be used to implement a computing device and a server, shown in FIG. 1 in accordance with some embodiments of the present disclosure.

FIG. 2 shows an example 200 of hardware that can be used to implement computing device 110 and/or server 120 in accordance with some embodiments of the present disclosure. As shown in FIG. 2, in some embodiments, computing device 110 can include a processor 202, a display 204, one or more inputs 206, one or more communication systems 208, and/or memory 210. In some embodiments, processor 202 can be any suitable hardware processor or combination of processors, such as a central processing unit (CPU), a graphics processing unit (GPU), an application specific integrated circuit (ASIC), a field-programmable gate array (FPGA), etc. In some embodiments, display 204 can include any suitable display devices, such as a computer monitor, a touchscreen, a television, etc. In some embodiments, inputs 206 can include any suitable input devices and/or sensors that can be used to receive user input, such as a keyboard, a mouse, a touchscreen, a microphone, etc.

In some embodiments, communications systems 208 can include any suitable hardware, firmware, and/or software for communicating information over communication network 108 and/or any other suitable communication networks. For example, communications systems 208 can include one or more transceivers, one or more communication chips and/or chip sets, etc. In a more particular example, communications systems 208 can include hardware, firmware and/or software that can be used to establish a Wi-Fi connection, a Bluetooth connection, a cellular connection, an Ethernet connection, etc.

In some embodiments, memory 210 can include any suitable storage device or devices that can be used to store instructions, values, etc., that can be used, for example, by processor 202 to perform a computer vision task, to present content using display 204, to communicate with server 120 via communications system(s) 208, etc. Memory 210 can include any suitable volatile memory, non-volatile memory, storage, or any suitable combination thereof. For example, memory 210 can include random access memory (RAM), read-only memory (ROM), electronically-erasable programmable read-only memory (EEPROM), one or more flash drives, one or more hard disks, one or more solid state drives, one or more optical drives, etc. In some embodiments, memory 210 can have encoded thereon a computer program for controlling operation of computing device 110. For example, in such embodiments, processor 202 can execute at least a portion of the computer program to transmit model data to server 120, receive model data from server 120, analyze differences between a counterexample and a satisfying instance for a property of an expression, and/or present results related to suspicion scores for a location of a buggy expression. As another example, processor 202 can execute at least a portion of the computer program to implement fault localization system 104. As yet another example, processor 202 can execute at least a portion of process 1000 described below in connection with FIG. 15.

In some embodiments, server 120 can include a processor 212, a display 214, one or more inputs 216, one or more communications systems 218, and/or memory 220. In some embodiments, processor 212 can be any suitable hardware processor or combination of processors, such as a CPU, a GPU, an ASIC, an FPGA, etc. In some embodiments, display 214 can include any suitable display devices, such as a computer monitor, a touchscreen, a television, etc. In some embodiments, inputs 216 can include any suitable input devices and/or sensors that can be used to receive user input, such as a keyboard, a mouse, a touchscreen, a microphone, etc.

In some embodiments, communications systems 218 can include any suitable hardware, firmware, and/or software for communicating information over communication network 108 and/or any other suitable communication networks. For example, communications systems 218 can include one or more transceivers, one or more communication chips and/or chip sets, etc. In a more particular example, communications systems 218 can include hardware, firmware and/or software that can be used to establish a Wi-Fi connection, a Bluetooth connection, a cellular connection, an Ethernet connection, etc.

In some embodiments, memory 220 can include any suitable storage device or devices that can be used to store instructions, values, etc., that can be used, for example, by processor 212 to present content using display 214, to communicate with one or more computing devices 110, etc. Memory 220 can include any suitable volatile memory, non-volatile memory, storage, or any suitable combination thereof. For example, memory 220 can include RAM, ROM, EEPROM, one or more flash drives, one or more hard disks, one or more solid state drives, one or more optical drives, etc. In some embodiments, memory 220 can have encoded thereon a server program for controlling operation of server 120. For example, in such embodiments, processor 212 can receive model data from computing device 110, transmit model data to computing device 110, analyze differences between a counterexample and a satisfying instance for a property of an expression, transmit results related to suspicion scores for a location of a buggy expression to computing device 110, and/or cause results related to the simulation to be presented (e.g., by computing device 110). As another example, processor 212 can execute at least a portion of the computer program to implement fault localization system 104. As yet another example, processor 212 can execute at least a portion of process 1000 described below in connection with FIG. 15.

Figures 5, 6:
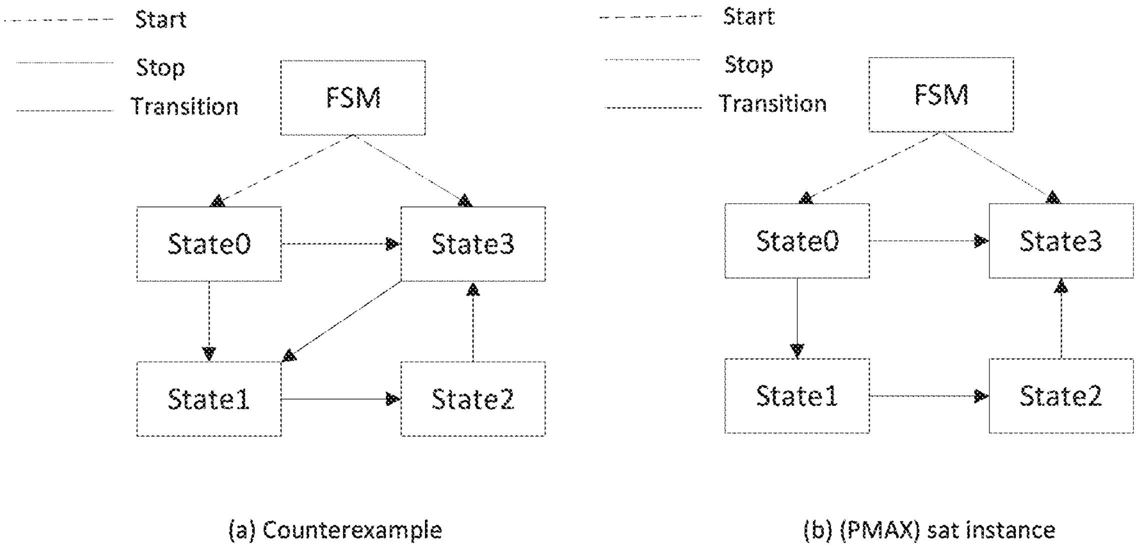
FIG. 5 shows a counterexample and a corresponding satisfying instance in accordance with some embodiments of the present disclosure.
FIG. 6 shows a text representation of the counterexample in FIG. 5, panel (a).

FIG. 3 shows an example Alloy specification 300 of a buggy finite state machine (FSM) model. Alloy specification 300 defines two type signatures, State and FSM, along with associated fields (lines 1-5). Specification 300 contains three fact paragraphs, expressing constraints, detailed as follows. (1) If a start (or a stop) state exists, there is only one of them (fact OneStartAndStop); (2) the start state is not a subset of the stop state; no transition terminates at the start state; and no transition leaves a stop state (fact ValidStartAndStop); (3) every state is reachable from the start state, and the stop state is reachable from any state (fact Reachability). Each assertion specifies a property that is expected to hold in all instances of the model. For example the assertion NoStopTransition checks that a stop state behaves as a sink. An automated analyzer of a declarative specification language, such as Alloy Analyzer, may disprove the assertion NoStopTransition by producing a counterexample (e.g., as shown in FIG. 5, panel (a)), in which a stop state labeled State3 transitions to State1. Thus, the FSM model does not behave as expected in at least one situation, which can be an example of a "bug" in the model causing an assertion violation.

Analysis of the model of FIG. 3 and the generated counterexample (shown in FIG. 5, panel (a)) generated in accordance with some embodiments of the present disclosure can reveal that a fault or bug is in the expression on line 19. Instead of stating that a stop state does not have any transition to any state, the expression states that any state not having a transition to anywhere is a stop state—a subtle logical error that is difficult for a human or inaccurate fault localization system to identify. There are two potential resolutions to the subtle logical error: (i) reverse the expression (e.g., to: s in FSM.stop=>s.transition=none), or (ii) replace the implication operator (=>) to logical equivalence (<=>), which strengthens the intended requirement. Thus, mechanisms described herein can be used to identify buggy expressions that may be otherwise missed, and can be used to automatically identify such expressions, such that buggy expressions can be more easily resolved.

FIG. 4 shows results obtained from the example model in FIG. 3 using mechanisms described herein. The results shown in FIG. 4 were generated using mechanisms described herein implemented in accordance with some embodiments based on an analysis of the model shown in FIG. 3. The results were generated relatively quickly (e.g., within one second). As shown in FIG. 4, the results include four suspicious expressions identified in the model shown in FIG. 3, with the expression on line 19 ranked first (e.g., as the most suspicious). Moreover, the results indicate that the operator => is likely the issue in the expression. Such a level of granularity can significantly help a developer understand and fix a problem with a model, such as the example model in FIG. 3. For example, as described below in connection with FIG. 12, implementations of mechanisms described herein can consistently rank an expression that includes at least one bug within the top 5 suspicious expressions in less than a duration of one second.

FIG. 5 shows a counterexample and a corresponding satisfying instance in accordance with some embodiments of the present disclosure. In some embodiments, a fault localization system implemented in accordance with some embodiments of the present disclosure can be used to analyze differences between instances of an input model that do not satisfy an assertion (sometimes referred to herein as counterexamples) and instances that do satisfy the assertion to find suspicious expressions in the input model. With regard to the model in FIG. 3, the fault localization system can check the assertion NoStopTransition in the model using an Alloy Analyzer, which can return the counterexample shown in panel (a) of FIG. 5. Next, the fault localization system can generate a satisfyinginstance (sometimes referred to herein as a sat instance) that is as minimal and similar to the counterexample as possible. Differences between the counterexample and the satisfying instance can be used to effectively localize one or more faults in the model.

To obtain a satisfying instance similar to the counterexample, a fault localization system implemented in accordance with some embodiments of the present disclosure can transform an input model into a logical formula representing hard constraints and the information from the counterexample into a formula representing soft constraints. For example, such a fault localization system can convert an instance finding problem into a partial-max SAT (PMAX) problem, and then use a known solver (such as, for example, a Pardinus solver) to find a solution that satisfies all of the hard constraints, and as many of the soft constraints as possible. The result can be an instance of the model that is similar to the counterexample, but satisfies the assertion. In a more particular example, FIG. 5, panel (b), shows a satisfying instance produced by a Pardinus solver (e.g., made available from the High-Assurance Software Laboratory (HASLab)), considering the counterexample shown in FIG. 5, panel (a). The satisfying instance in FIG. 5, panel (b), is similar to the counterexample in FIG. 5, panel (a), except for the edge from State3 to State1. In some embodiments, a fault localization system implemented in accordance with some embodiments of the present disclosure can analyze differences between counterexamples and satisfying instances—e.g., in FIG. 5, the transition from State3 to State1, which only appears in the counterexample, but not the satisfying instance—to identify relations that are likely to be causing an issue.

FIG. 6 shows a text representation of the counterexample in FIG. 5, panel (a). The transition relation involves the tuple State3→State1 and the stop relation involves State3. Thus, in some embodiments, a fault localization system can identify that two relations of transition and stop may cause differences between two models. While the illustrated example of FIG. 5 shows a single counterexample and one corresponding satisfying instance, some embodiments of the present disclosure can also support analyzing multiple pairs of counterexamples and satisfying instances (e.g., in tandem).

In some embodiments, a fault localization system implemented in accordance with some embodiments of the present disclosure can slice an input model to contain only expressions affecting both relations "transition" and "FSM.stop." This can result in two expressions: (1) all s: State|FSM.stop in s.*transition (line 25 in FIG. 3), and (2) all s: State|s.transition=none=>s in FSM.stop (line 19 in FIG. 3). At this point, the fault localization system can stop and return these two expressions, one of which is the buggy expression on line 19 in FIG. 3. While some conventional fault localization techniques (e.g., Tarantula, and Ochiai) purport to produce this level of "statement" granularity, mechanisms described herein can be used to achieve a finer-grained granularity level (e.g., by also considering the Boolean and relational subexpressions, as described herein).

Referring again to FIG. 3, the expressions on lines 25 and 19 have four Boolean nodes or expressions: (a) FSM.stop in s.*transition, (b) s.transition=none, (c) s in FSM.stop, and (d) s.transition=none=>s in FSM.stop. Mechanisms described herein can be used to instantiate each of the four Boolean nodes with State1 and State3, the values that differentiate the counterexample and satisfying instance. For example, node (a) can be instantiated as FSM.stop in S1.*transition and FSM.stop in S3.*transition. Further, mechanisms described herein can be used to evaluate such instantiations using the counterexamples and satisfying instance, and can be used to assign a higher suspicion score to those with inconsistent evaluation results. For example, the instantiations FSM.stop in S1.*transition and FSM.stop in S3.*transition of node (a) evaluate to True in both the counterexample and satisfying instance, so node (a) is given a score of 0 (i.e., no changes). Node (b) is assigned a score of 1 because State3.transition=none evaluates to False in the counterexample, but to True in the satisfying instance (i.e. there is 1 change), and State1.transition=none evaluates to False in both the counterexample and the satisfying instance (i.e. there is no change). Overall, with the example model shown in FIG. 3, mechanisms described herein may obtains the scores 0, 1, 0, 1 for nodes (a), (b), (c), (d), respectively. Thus, mechanisms described herein can be used to determine that nodes (b) s.transition=none and (d) s.transition=none=>s in FSM.stop are the two most suspicious Boolean subexpressions within the expression on line 19 of FIG. 3. Again, this level of granularity in analyzing Boolean and relational subexpressions can provide more accurate and/or more detailed results than some conventional fault localization techniques.

Still referring to FIGS. 3-6, while expression (d) contains an error, it receives the same score as expression (a), which does not contain an error. To achieve more accurate results, mechanisms described herein can be used to further analyze relations between the expressions. Referring to the example model of FIG. 3, mechanisms described herein can be used to instantiate the expressions with State1 and State3, assess them in the context of the counterexample and satisfying instance, and assign scores based on evaluations. For example, node (d) s.transition=none=>s in FSM.stop includes 3 relations: (1) s.transition, (2) s, and (3) FSM.stop. Instantiating these relations with State3 and evaluating them using the counterexample can be performed as follows: (1) becomes {State1}, (2) {State3}, and (3) {State3}. Thus, for the counterexample, (d) involves both State1 and State3, and mechanisms described herein can give (d) a score of 1. Next, mechanisms described herein can be used to evaluate the instantiations using the satisfying instance as follows: (1) becomes { }, (2) {State3}, and (3) {State3}. In this example, (d) does not include State1 and therefore has a score of 0. In such an example, mechanisms described herein can assign (d) an average score of 0.5 (for the instantiations of State3). Performing a similar computation for the instantiation of State1 obtains a score of 2/3 for (d) as the evaluation for the counterexample and satisfying instance involves both State1 and State3 (differentiated values) and State2 (regular value). Thus, (d) has a score of 0.58 (i.e. the average of 0.5 and 2/3). Overall, for the example model in FIG. 3, mechanisms described herein can obtain the scores 0.5, 0.25, 0.5, 0.58 for (a), (b), (c), and (d), respectively. In this analysis, node (d) is ranked higher than node (a), as desired.

In some embodiments, mechanisms described herein can be used to compute a suspicion score of a node as a sum of the Boolean and relational scores of the node, as described above. For example, the node (d) s.transition=none=>s in FSM.stop in the expression on line 19 of FIG. 3 has the highest suspicion score of 1.58 (see FIG. 4). FIG. 4 shows suspicion scores of the expressions in a ranked list that can be generated and presented using mechanisms described herein. Further, in some embodiments, mechanisms described herein can be used to analyze (non-atomic) nodes containing (Boolean) connectors and can report connectors that connect sub-nodes with different scores. For example, a fault localization system implemented in accordance with some embodiments of the present disclosure can suggest that the operator => in line 19 of FIG. 3 is likely responsible for the error in node (d) because the two subexpressions s.transition=none, and s in FSM.stop have different suspicion scores (e.g., as shown in FIG. 4). In the example shown in FIGS. 3 and 4, the assertion violation is entirely due to the => operator (a potential fix would be strengthening the model of FIG. 3 to <=>, or switching the two subexpressions).

Figure 7:
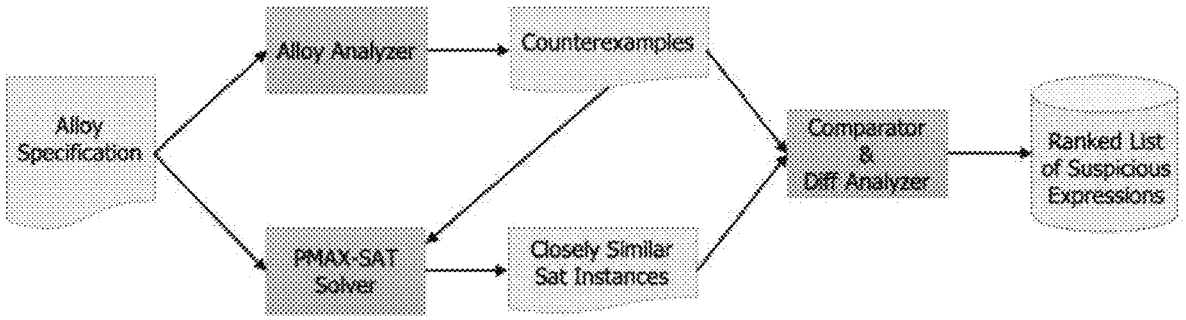
FIG. 7 shows a schematic example of a system for a system for fault localization in declarative specification languages in accordance with some embodiments of the present disclosure, which takes as an input an Alloy model.

FIG. 7 shows a schematic example 700 of a system for fault localization in declarative specification languages in accordance with some embodiments of the present disclosure, which takes as an input an Alloy model. The Alloy model has a violated assertion and system 700 can return a ranked list of suspicious expressions that contribute to the violated assertion. In some embodiments, system 700 can use an Alloy Analyzer to find counterexamples showing the violation of the assertion. Additionally, in some embodiments, system 700 can use a PMAX-SAT solver to find satisfying instances that are relatively close (e.g., as close as possible) to the counterexamples. In some embodiments, system 700 can analyze differences between the counterexamples and satisfying instances to find expressions in the Alloy model that likely cause the errors. Additionally, in some embodiments, system 700 can compute and return a ranked list of suspicious expressions.

In the example of FIG. 7, an alloy specification or model can include various components, such as: (i) Type signatures (sig) that define essential data types, and fields that capture relationships among such data types, (ii) facts, predicates (pred), and assertions (assert) (e.g., formulae defining constraints over data types), and/or (iii) run and check commands to invoke an Alloy Analyzer. The "check" command can be used to find counterexamples that violate some asserted property, and "run" can be used to find satisfying model instances (sat instances). For example, for a model M and a property p, a counterexample can be an instance of M that satisfies $M \wedge \neg p$, and a satisfying instance can be one that satisfies $M \wedge p$. In a particular example, the example specification shown in FIG. 3 defines two signatures (FSM, State), three fields (start, stop, transition), three facts (OneStartStop, ValidStart, ValidStop), and one assertion (NoStopTransition).

In some embodiments, analysis of specifications written in Alloy using mechanisms described herein can be entirely automated, yet bounded up to user-specified scopes on the size of type signatures. For example, to check that p is satisfied by all instances of M (e.g., indicating that p is valid) up to a certain scope, a developer can encode p as an assertion and use the "check" command to validate the assertion (e.g., showing that no counterexample exists within the specified scope, where a counterexample is an instance I such that $I \models M \wedge \neg p$). To check that p is satisfied by some instances of M, a developer can encode p as a predicate and use the "run" command to analyze the predicate, (e.g., searching for a sat instance I such that $I \models M \wedge p$). Referring again to the example in FIG. 3, the "check" command can be used to examine the NoStopTransition assertion, and can return a counterexample in FIG. 5, panel (a).

Internally, declarative specification languages, such as Alloy can convert tasks of searching for instances into Boolean formulae and can use a SAT solver to check the satisfiability of the formulae. Each value of each relation can be translated to a distinct variable in the Boolean formula. For example, given a scope of 5 in the FSM model in FIG. 3, the relation State includes 5 values and can be translated to 5 distinct variables in the Boolean formula, and the transition can be translated to 25 values representing 25 values of combinations of $\|State\| \times \|State\|$. An instance is an assignment for all variables that makes a formula True. For example, the counterexample in FIG. 3, panel (a), is an assignment where all variables corresponding to values in FIG. 2 are assigned True and all other variables are assigned False. A declarative specification language, such as Alloy, can translates a result from the SAT solver (e.g., an assignment that makes a Boolean formula True, back to an instance of M).

FIG. 8 shows an example algorithm that can be used to analyze differences between pairs of instances in accordance with some embodiments of the present disclosure. The example algorithm of FIG. 8 can take as input an Alloy model M and a property p that is not satisfied by M (as an assertion violation), and the example algorithm of FIG. 8 can return a ranked list of expressions that likely contribute to the assertion violation. In some embodiments, an Alloy Analyzer and a PMAX-SAT solver, such as Pardinus, can be used to generate pairs of counterexamples and closely similar satisfying instances. In some embodiments, the example algorithm of FIG. 8 can analyze the differences between the counterexample and satisfying instances to locate an error. If no satisfying instance can be generated, mechanisms described herein can be used to inspect the unsatisfying core returned by the Alloy Analyzer to locate an error.

Figure 9:
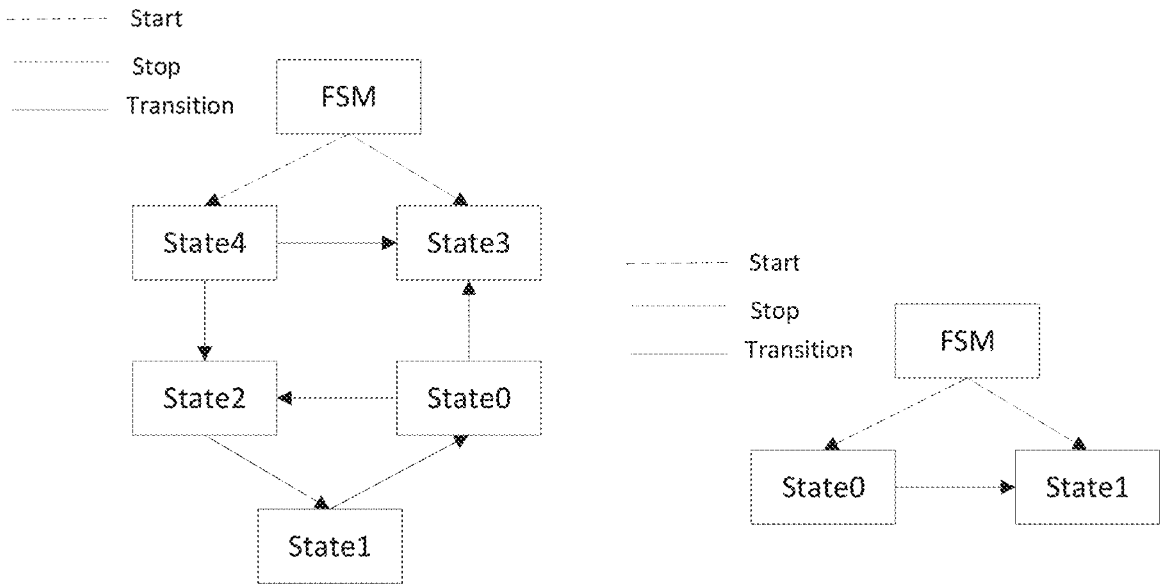
FIG. 9 shows two example Alloy-generated satisfying instances.

In some embodiments of the present disclosure, a fault localization system (e.g., fault localization system 104) can obtain differences between counterexamples and relevant satisfying instances to determine why M does not satisfy p. The differences can lead to the cause of an error. For example, an Alloy Analyzer can be used to generate a satisfying instance directly (e.g., by checking a predicate consisting of p). However, such an instance generated by Alloy is often predominantly different from the counterexample, and thus may not help identify the main difference. For example, the counterexample, shown in FIG. 5, panel (a), that violates the assertion NoStopTransition is quite different from the two Alloy-generated satisfying instances shown in FIG. 9, which shows two example Alloy-generated satisfying instances. To generate a satisfying instance closely similar to the counterexample, the problem can be reduced to a PMAX-SAT (partial maximum satisfiability) problem.

In some embodiments, the fault localization system can compare generated counterexamples and satisfying instances to obtain differences between the counterexamples and satisfying instances, which can involve atoms, tuples, and relations. For example, the fault localization system can obtain tuples and associated atoms that are different between the counterexamples and satisfying instance (e.g., in FIG. 5, the tuple State3→State1, which has the atoms State1 and State3, is in the counterexample but not in the satisfying instance). As another example, the fault localization system can obtain relations with different tuples between the counterexample and satisfying instance (e.g., the transition relation involves the tuple State3→State1 in the counterexample, but not in the satisfying instance). As yet another example, the fault localization system can obtain relations that can be inferred from the tuples and atoms derived in the previous steps (e.g., the relation FSM.stop involves tuples having the State3 atom). In such examples, for the pair of counterexamples and satisfying instance in FIG. 5, the fault localization system can obtain the suspicious relations "transitions" and "stop" and the atoms "State1," "State3." In some embodiments, the fault localization system can perform such comparisons for all pairs of satisfying instances and counterexamples and uses the common results.

After obtaining differences in relations and atoms between counterexamples and satisfying instances, the fault localization system can analyze the differences to obtain a ranked list of expressions based on the suspicion level associated with each expression. Higher suspicion scores can be assigned to expressions for which the evaluation(s) depends on the differences (and lower scores can be assigned to expressions for which the evaluation(s) that do not depend on the differences).

FIG. 10 shows an example algorithm that can be used to analyze differences between pairs of instances in accordance with some embodiments of the present disclosure. The example algorithm of FIG. 10 can take as inputs a model "M," differences "diffs," and pairs of counterexamples and satisfying instances "pairs" to output a ranked list of suspicious expressions in M. The example algorithm of FIG. 10 can be used to identify expressions in M that involve relations in diffs. These expressions can be related to the difference between counterexamples and satisfying instances. For example, in the model in FIG. 3, two expressions are identified: all s: State|FSM.stop in s.*transition on line 25 of FIG. 3, and all s: State|s.transition=none=>s in FSM.stop on line 19 of FIG. 3, as they involve the relations transition and stop in diffs. The example algorithm of FIG. 10 can then recursively compute a suspicion score for each collected expression e, represented as an abstract syntax (AST) tree. If e is a leaf (e.g., a relational expression), the example algorithm instantiates e with atoms from diffs. The example algorithm can then be used to evaluate the instantiated expression for each pair of counterexamples and satisfying instance. If the evaluated result for an instantiated expression contains all atoms involved in diffs, the algorithm can compute the score as the size of diffs divided by the size of evaluated results; otherwise, the score can be 0. For a pair, the score can be the average score of counterexamples and satisfying instance. The score of e can be the average among all pairs. For example, a higher suspicion score can be assigned to a relational subexpression for which an evaluation involves many atoms in diffs. If e is not a leaf node, e's score can be the sum of Boolean and relational scores. If e is a Boolean expression (e.g., an expression that returns True or False), e is instantiated with atoms from diffs and is evaluated on each counterexample and satisfying instance pair. If e has different results between the counterexample and the satisfying instance (e.g., one is True and the other is False), e's score can be increased by 1. Thus, a higher Boolean score can be assigned to expressions for which an evaluation does not match between pairs of the counterexamples and satisfying instances. Then e's relational score can be calculated as the sum of e's children. The final score assigned to each expression can be the sum of the e's Boolean scores and the relational scores of e's children. In some embodiments, all of the expressions ranked by suspicion scores can be returned.

Considering the expression s.transition=none in FIG. 3. For the counterexample and satisfying instance pair in FIG. 5, diffs contain two atoms State1 and State3. The algorithm of FIG. 10 can instantiate the expression under analysis with the atoms mentioned above (e.g., State1 and State3) into two concrete expressions: (1) State1.transition=none and (2) State3.transition=none. The concrete expression (1) can evaluate to False in both the counterexample and satisfying instance, while the concrete expression (2) can evaluate to True in the counterexample and False in the satisfying instance. Thus, the Boolean score for the expression under analysis can be 1 as the aggregation of the values obtained for the concrete expressions (1) and (2). A fault localization system implemented in accordance with some embodiments of the present disclosure can then compute a relational score for the expression under analysis as the sum of the relational scores for its children: s.transition and none, both of which are leaves. To compute the score for s.transition, it can be instantiated to State1.transition and State3.transition.

State1.transition can evaluate to State2 in both the counterexample and the satisfying instance. Thus, it gets a score of 0. For State3.transition, in the counterexample, it evaluates to State1 and gets a score of 1 as the size of different values {State3, State1} divided by the size of the instantiated values {State3} and the evaluated values {State1}. In the satisfying instance, it evaluates to an empty set and gets a score of 0. Overall, s.transition gets a relational score of 0.25 as the average of all its instantiated expressions: State1.transition (0) and State3.transition (0.5). Finally, the overall score of 1.25 is assigned to the expression s.transition=none as the aggregation of its Boolean and relational scores.

FIG. 11 shows an example algorithm that can be used to analyze a set of unsatisfying formulas shows two example Alloy-generated satisfying instances. It is possible that no satisfying instances can be generated for one or more counterexamples, which can indicate that some constraints in the model have conflicts with a property being checked. The example algorithm of FIG. 11 can be used to determine why a set of constraints cannot be satisfied by giving a minimal subset of conflicting constraints. Those conflicting constraints can help identify suspicious expressions. The algorithm of FIG. 11 can take as input a model M, an unsat core U, and a counterexample c showing that M does not satisfy a property p. The algorithm of FIG. 11 can outputs a list of expressions in M that conflict with p. The values M, U, and c, are also referenced above in connection with the algorithm of FIG. 8.

In line 1 of the algorithm of FIG. 11, a sliced model $M^1$ can be produced in which all expressions in the unsat core are omitted from the original model M. Removing the conflicting expressions in the unsat core allows satisfying instances from the new model $M^1$ to be obtained to compare with the counterexample. A minimal satisfying instance from $M^1$ is generated and compared with the input counterexample to obtain the differences between the counterexample and the satisfying instance. Then, the algorithm of FIG. 11 may identify which of the removed expressions conflict with p by evaluating them on obtained differences. If an expression evaluates to True, then adding that expression back to the model can still allow the satisfying instance to be generated (e.g., the expression is not conflicting with p). Thus, expressions that evaluate to False can be identified as conflicting with p and can be returned as suspicious expressions. Similar scores can be assigned to these resulting expressions because they all contribute to the unsatisfiability of the original model and the intended property. For example, if line 17 is changed in the model shown in FIG. 3 to all s: State|s.transition !in FSM.start, a declarative specification language, such as Alloy, can find counterexamples, such as the one in FIG. 5, but may fail to generate any satisfying instances. This is because the modified line 17 forces all states to have some transitions, which conflicts with the constraint requiring no transition for stop states. From the unsat core, the example algorithm of FIG. 11 can identify four expressions in the model: (a) all start1, start2: FSM.start|start1=start2, (b) some FSM.stop, (c) FSM.start !in FSM.stop and (d) all s: State|s.transition !in FSM.start. After removing these four expressions from the model, the algorithm of FIG. 11 can generate the same sat instance in FIG. 5, panel (b). As before, the main difference between the counterexample and the satisfying instance involves two values: State1 and State3. Then, the algorithm of FIG. 11 can evaluate each expression using these values (e.g., State1 and State 3). Expressions (a), (b), and (c) evaluate to True for both values, while expression (d) evaluates to False for State3. Thus, the algorithm of FIG. 11 can correctly identify (d) as a suspicious expression.

FIG. 12 shows example results generated using mechanisms described herein to locate faults in 152 buggy models. The 152 buggy models were collected from 12 Alloy models in AlloyFL. Briefly, the models are addr (address book) and farmer (farmer cross-river puzzle) from Alloy; bempl (bad employer), grade (grade book) and other (access-control specifications) are from Amalgam; and arr (array), bst (balanced search tree), ctree (colored tree), cd (class diagram), dll (doubly linked list), fsm (finite state machine), and ssl (sorted singly linked list) are homework assignments from AlloyFL. For models with assertions (e.g., from Amalgam), those assertions were used to collect results. For models that do not have assertions (e.g., homework assignments), assertions and expected predicates were manually created. Embodiments of the present disclosure deal with models containing multiple violated assertions by analyzing them separately and returning a ranked list for each assertion. For illustration purposes, this is simulated by simply splitting models with separate violations into separate models (e.g., bst2 contains two assertion violations and thus are split into two models bst2, bst2_1). Finally, mechanisms described herein can be highly automatic. For example, a fault localization system implemented in accordance with some embodiments of the present disclosure can have just one user-configurable option: the number of pairs of counterexamples and satisfying instances to be generated (which by default may be set to a particular number, such as 5). For each model, FIG. 12 lists the name, lines of code, the number of nodes that the example implementation determined to be irrelevant and sliced out, and the number of total AST expression nodes. The last two columns show the resulting ranking of the correct node and its total run time in seconds. The 28 italicized models include predicate violations, while the other 124 models include assertion violations. In some embodiments, mechanisms described herein can be used to automatically determine the violation type and utilize an appropriate technique (e.g., using a comparator for assertion errors and an unsat analyzer for predicate violations). Finally, the models are listed in sorted order based on their ranking results.

In summary, FIG. 12 shows that an example fault localization system implemented in accordance with some embodiments of the present disclosure was able to rank buggy expressions in the top 1 (e.g., the buggy expression is ranked first) for 91 (60%) of the models, top 2 to 5 for 35 (23%) of the models, top 6 to 10 for 10 (34%) of the models, above top 10 for 6 (4%) of the 152 models. For 10 models, the example fault localization system was not able to identify the cause of the errors (e.g., the buggy expression are not in the ranking list), some of which include assertion errors that are not due to any existing expressions in the model, but rather because the model is "missing" some constraints. Also shown in FIG. 12 is that the example fault localization system generated results very quickly (e.g., in under one second). As shown in FIG. 12, the example fault localization system was able to locate and rank the buggy expressions in 142 out of the 152 models analyzed. Many of the bugs are common errors that are often undetected by humans, such as when a developer fails to consider certain corner cases. For example, stu5 contains the buggy expression all n: This.header.*link|n.elem<=n.link.elem that does not allow any node without link (the fix is changing the buggy expression to all n: This.header.*link|some n.link=> n.elem<=n.link.elem). In some embodiments, mechanisms described herein can be used to successfully recognize the difference that the last node of the list contains a link to itself in the counterexample but not in the satisfying instance, and can rank this expression second. Additionally, the example fault localization system can rank the subexpression n.elem<=n.link.elem first, where the fix is actually needed. The example fault localization system used to generate the results in FIG. 12 also performed especially well on 28 models with violated predicates by analyzing the unsat cores and correctly ranking the buggy expressions first.

FIG. 13 shows example results generated using mechanisms described herein to analyze large complex models. For example, a model of surgical robots may be used to verify a critical arm movement safety property: a check that a position of a robot arm is in the same position that a surgeon articulates in a control workspace during a surgery procedure and that the surgeon is notified if the arm is pushed outside of its physical range. This property is formulated as an assertion and checked on 15 models (such as Alloy models) representing 15 types of robot arms using different combinations of hardware and software features. A study found that 5 models violate the property. FIG. 13, which has the same format as FIG. 12, and lists the results of the study. For each model, an example fault localization system implemented in accordance with some embodiments of the present disclosure ranked the correct buggy expressions in the second place in less than 3 seconds. The example fault localization system returned two suspicious expressions: (1) HapticsDisabled in UsedGeomagicTouch.force, and (2) some notification: GeomagicTouch.force notification=HapticsEnabled. Modifying either expression would fix the issue (e.g., changing Disable to Enabled in (1) or Enabled to Disabled in (2)).

Still referring to FIG. 13, and as another example, mechanisms described herein can be used to analyze models for the permissions of one or more electronic devices, such as Android operating systems and applications (sometimes referred to as apps) to find inter-app communication vulnerabilities. FIG. 13 shows that an example fault localization system was able to locate 4 buggy expressions (the unary modification ranked 2nd, the binary operations ranked 3rd, 9th, and 11th), but did not identify a mutated expression (variable declaration mutations). However, the mutated expression did not contribute to the assertion violation, and accordingly, the example fault localization system was correct in not identifying the mutated expression as a fault.

Still referring to FIG. 13, and as another example, mechanisms described herein can be used to verify translations of annotated code (TACOs). TACO can automatically convert a Java program annotated with invariants to an Alloy model with an assertion. If the Java program contains a bug that violates the annotated invariant, then checking the assertion in the Alloy model can provide a counterexample. The example fault localization system was tested on three different Alloy models with violated assertions representing three real Java programs from TACO: sll-contains checks if a particular element exists in a linked list; count-nodes counts the number of a list's nodes; and remove-nth removes the nth element of a list. These (machine-generated) models are much larger than typical Alloy models (5000 to 6000 LoC each). FIG. 13 shows the results of tests run on these three different Alloy models. For ssl-contains, the example fault localization model ranked the buggy expression third within 3 seconds. This expression helps to locate an error in the original Java program that skips the list header. The faulty expressions of remove-nth and count-nodes are ranked 12th and 18th, respectively (which are still beneficial given the large, >5000, number of possible locations). As shown in FIG. 13, the example fault localization system worked well on large real-world declarative specification models (such as Alloy models). While developing correct fixes for these models remains nontrivial, mechanisms described herein can help developers (or automatic program repair tools) quickly locate buggy expressions, which in turn helps to understand (and hopefully repair) the actual errors in original models.

FIG. 14 shows an example comparing performance of mechanisms described herein and another technique locating faults in various models. Row 1 highlights results for an example fault localization system implemented in accordance with some embodiments of the present disclosure. Row 2 highlights results for the AlloyFL fault localization system, which is a currently available fault localization system for the declarative specification language Alloy. As described above, mechanisms described herein utilize violated assertions and counterexamples to identify faults, which is different than AlloyFl. As shown in FIG. 14, the example fault localization system was more accurate at identifying the top 1 buggy expression than AlloyFL (e.g., 91 models compared to 76 models). On average, buggy expressions in a model rank 2.4 using the example fault localization system, compared to a ranking of 3.1 compared to AlloyFl. Moreover, the example fault localization system was much faster than AlloyFl at identifying buggy expressions. AlloyFl took 32.4 seconds to analyze a specification that was analyzed by the example fault localization system in only 0.2 seconds. Therefore, as models continue to grow more complex for a variety of applications, it is clear that mechanisms described herein can provide improved accuracy and efficiency over conventional techniques for fault localization in declarative specification languages.

Figure 15:
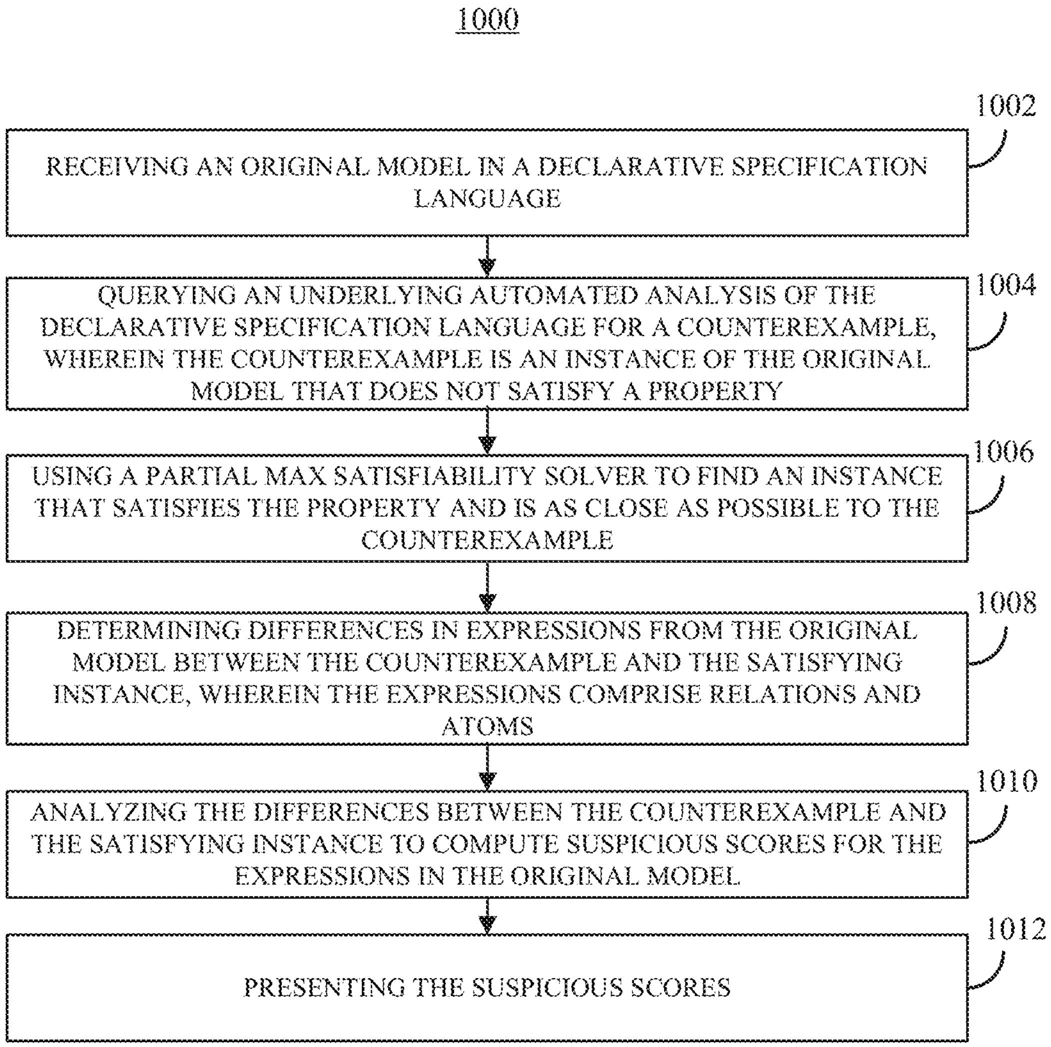
FIG. 15 shows an example of a process for fault localization in a model in accordance with some embodiments of the present disclosure.

FIG. 15 shows an example 1000 of a process for fault localization in a model in accordance with some embodiments of the present disclosure. At 1002, process 1000 can receive an original model in a declarative specification language. In some embodiments, the declarative specification language can be Alloy. Further, in some embodiments, the original model can be a model for surgical robots, or Java programs, or permissions on one or more electronic devices (e.g. Android permissions).

In some embodiments, process 1000 can receive the original model from any suitable source and/or using any suitable technique or combination of techniques. For example, the original model can be received from model data source 102 (e.g., over communication network 108, via a local connection, etc.).

At 1004, process 1000 can query an underlying automated analysis of the declarative specification language for a counterexample using any suitable technique or combination of techniques. In some embodiments, the counterexample can be an instance of the original model that does not satisfy a property. In some embodiments, such as embodiments where the declarative specification language is Alloy, the underlying automated analysis can be an Alloy Analyzer. For example, process 1000 can query an Alloy Analyzer for at least one counterexample that does not satisfy an assertion associated with the model received at 1002 (e.g., as described above in connection with FIGS. 3-7).

At 1006, process 1000 can use a partial max satisfiability solver (PMAX-SAT) to find an instance that satisfies the property and is a close as possible to the counterexample using any suitable technique or combination of techniques. For example, process 1000 can transform the input model into a logical formula representing hard constraints, and information from a counterexample into soft constraints, and can use a solver to find a solution that satisfies all of the hard constraints and as many of the soft constraints as possible (e.g., as described above in connection with FIGS. 5-9). As a more particular example, process 1000 can use a Pardinus solver to identify an instance that satisfies the hard constraints and as many soft constraints as possible.

At 1008, process 1000 can determine differences in expressions from the original model between the counterexample and the satisfying instance. The expressions can include relations and atoms, and process 1000 can determine differences between relations and/or atoms between the counterexample and the satisfying instance. In a particular example, expressions in Alloy can be constrained to use only relations and atoms. In some embodiments, process 100 can determine differences in the expressions using any suitable technique or combination of techniques. For example, process 1000 can use techniques described above in connection with FIGS. 8, 10, and/or FIG. 11 to determine differences between the counterexample and the satisfying instance.

At 1010, process 1000 can analyze the differences between the counterexample and the satisfying instance to compute suspicion scores for the expressions in the original model using any suitable technique or combination of techniques. For example, process 1000 can use techniques described above in connection with FIGS. 8, 10, and/or FIG. 11 to analyze differences between the counterexample and the satisfying instance.

At 1012, process 1000 can present the suspicion scores using any suitable technique or combination of techniques. For example, process 1000 can cause a computing device (e.g., computing device 110) to present a ranked list of suspicious expressions in the model received at 1002.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above-described steps of the processes of FIGS. 8, 10, 11, and/or 15 can be executed or performed in any order or sequence not limited to the order and sequence shown and described in the figures. Also, some of the above steps of the processes of FIGS. 8, 10, 11, and/or 15 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for fault localization, the method comprising:
receiving a model in a declarative specification language;
querying an automated analysis of the declarative specification language for a counterexample, wherein the counterexample is an instance of the model that does not satisfy a property;
using a partial max satisfiability solver and the counterexample to find a satisfying instance corresponding to the counterexample that satisfies the property;
determining, for a plurality of expressions from the model, one or more differences between the counterexample and the satisfying instance,
wherein the plurality of expressions comprises a Boolean expression and a relational expression;
analyzing the one or more differences between the counterexample and the satisfying instance;
determining a suspicion score for the plurality of expressions in the model, wherein the suspicion score is based on a score of the Boolean expression and a score of the relational expression, and wherein the suspicion score is determined based on consistency of evaluation of the plurality of expressions and transitions between the plurality of expressions and connected expressions; and
causing the suspicion score to be presented.

2. The method of claim 1, wherein the declarative specification language is Alloy.

3. The method of claim 1, wherein the plurality of expressions comprises one or more relations and one or more atoms.

4. The method of claim 1, further comprising:
determining, for each of the plurality of expressions in the model, a respective suspicion score of a respective plurality of suspicion scores; and
causing the respective plurality of suspicion scores to be presented.

5. The method of claim 1, wherein the model models a positioning of one or more surgical robots.

6. The method of claim 1, wherein the model models permissions on one or more electronic devices.

7. A system for fault localization, the system comprising:
at least one processor that is programmed to:
receive a model in a declarative specification language;
query an automated analysis of the declarative specification language for a counterexample, wherein the counterexample is an instance of the model that does not satisfy a property;
use a partial max satisfiability solver and the counterexample to find a satisfying instance corresponding to the counterexample that satisfies the property;
determine, for a plurality of expressions from the model, one or more differences between the counterexample and the satisfying instance,
wherein the plurality of expressions comprises a Boolean expression and a relational expression;
analyze the one or more differences between the counterexample and the satisfying instance;
determine a suspicion score for the plurality of expressions in the model, wherein the suspicion score is based on a score of the Boolean expression and a score of the relational expression, and wherein the suspicion score is determined based on consistency of evaluation of the plurality of expressions and transitions between the plurality of expressions and connected expressions; and cause the suspicion score to be presented.

8. The system of claim 7, wherein the declarative specification language is Alloy.

9. The system of claim 7, wherein the plurality of expressions comprises one or more relations and one or more atoms.

10. The system of claim 7, wherein the at least one processor is further programmed to:

determine, for each of the plurality of expressions in the model, a respective suspicion score of a respective plurality of suspicion scores; and cause the respective plurality of suspicion scores to be presented.

11. The system of claim 7, wherein the model models a positioning of one or more surgical robots.

12. The system of claim 7, wherein the model models permissions on one or more electronic devices.

13. A non-transitory computer readable medium containing computer executable instructions that, when executed by a processor, cause the processor to perform a method for fault localization, the method comprising:

receiving a model in a declarative specification language;

querying an automated analysis of the declarative specification language for a counterexample, wherein the counterexample is an instance of the model that does not satisfy a property;

using a partial max satisfiability solver and the counterexample to find a satisfying instance corresponding to the counterexample that satisfies the property;

determining, for a plurality of expressions from the model, one or more differences between the counterexample and the satisfying instance, wherein the plurality of expressions comprises a Boolean expression and a relational expression;

analyzing the one or more differences between the counterexample and the satisfying instance;

determining a suspicion score for the plurality of expressions in the model, wherein the suspicion score is based on a score of the Boolean expression and a score of the relational expression, and wherein the suspicion score is determined based on consistency of evaluation of the plurality of expressions and transitions between the plurality of expressions and connected expressions; and causing the suspicion score to be presented.

14. The non-transitory computer readable medium of claim 13, wherein the declarative specification language is Alloy.

15. The non-transitory computer readable medium of claim 13, wherein the plurality of expressions comprises one or more relations and one or more atoms.

16. The non-transitory computer readable medium of claim 13, the method further comprising:

determining, for each of the plurality of expressions in the model, a respective suspicion score of a respective plurality of suspicion scores; and causing the respective plurality of suspicion scores to be presented.

17. The non-transitory computer readable medium of claim 13, wherein the model models a positioning of one or more surgical robots.

18. The non-transitory computer readable medium of claim 13, wherein the model models permissions on one or more electronic devices.

* * * * *